US005872576A

United States Patent [19]

Ishikawa

[11] Patent Number: 5,872,576

[45] Date of Patent: Feb. 16, 1999

[54] MASK DATA GENERATOR FOR A GRAPHICS LSI

[75] Inventor: Koji Ishikawa, Tokyo, Japan

[73] Assignee: NEC Corporation, Tokyo, Japan

[21] Appl. No.: 882,489

[22] Filed: Jun. 25, 1997

[30] Foreign Application Priority Data

Jun. 28, 1996 [JP] Japan .................................... 8-169737

[51] Int. Cl.[6] ........................................................ G06F 13/00

[52] U.S. Cl. ........................... 345/523; 345/191; 395/565

[58] Field of Search ..................................... 345/191, 523, 345/524; 395/565

[56] References Cited

U.S. PATENT DOCUMENTS

| | | | |
|---|---|---|---|
| 4,180,861 | 12/1979 | Armstrong et al. | 395/565 |
| 4,943,801 | 7/1990 | Oguchi | 345/191 |
| 5,729,725 | 3/1998 | Kato et al. | 395/565 |

FOREIGN PATENT DOCUMENTS 4-225453 8/1992 Japan .

*Primary Examiner*—Kee M. Tung

*Assistant Examiner*—Sy Danh Luu

*Attorney, Agent, or Firm*—Young & Thompson

[57] ABSTRACT

In order to provide a mask data generator operating at a sufficient speed with a small circuit scale for generating mask data to mask a sequence of drawing data composed of a plurality of data blocks, the mask data generator of the invention has a first and a second mask data generation circuits (200, 201), each comprising; bit pattern extracting means (211) for obtaining a first bit pattern indicating a boundary block wherein pixel data designated by address data are included and a second bit pattern indicating a position of the pixel data in the boundary block; a boundary byte discrimination circuit (216) for discriminating the boundary block making use of the first bit pattern; and an array of multiplexers (217) each corresponding to each of the plurality of data blocks, one multiplexer, which corresponds to the boundary block, selecting the second bit pattern controlled by the boundary byte discrimination circuit, and each of the other multiplexers selecting either a bit pattern of all ‘0’ or a bit pattern of all ‘1’ according to each position of corresponding data block relative to the boundary block controlled by the boundary byte discrimination circuit.

4 Claims, 8 Drawing Sheets

128 bytes
00h
10h
20h
30h
40h
50h
60h
70h
500
(52-th)
34h
501
(5-th)
(7-th)
515
514
0110b
0110b
502
FF
F0
00

MASK DATA GENERATOR FOR A GRAPHICS LSI

BACKGROUND OF THE INVENTION

The present invention relates to a mask data generator applied for a graphics LSI (Large Scale Integrated circuit), and particularly to a mask data generator for generating mask data to be used for masking a sequence of drawing data to be written in a frame buffer with one access.

First, mask data generation performed in the graphics LSI is described.

FIG. 1 is a schematic diagram illustrating an example of the graphics LSI for drawing graphic images especially such as lines, rectangular frames or rectangular fills, having a command execution section 101, an address generator 102, a drawing data processor 103 and a mask data generator 104. The command execution section 101 generates control signals to be delivered to the address generator 102, the drawing data processor 103 and the mask data generator 104, according to parameters and command data transmitted from a CPU (Central Processor Unit) 100. The address generator 102 generates an access address indicating a start address of a frame buffer 105 from where a sequence of drawing data is written sequentially with one access. The drawing data processor 103 prepares the sequence of drawing data to be written in the frame buffer 105. The mask data generator 104 generates mask data according to the access address generated by the address generator 102 controlled by the command execution section 101. Each bit of the mask data corresponds to each byte of the sequence of drawing data and indicates if data of corresponding byte of the sequence of drawing data are to be replaced or not with data of corresponding address of the frame buffer 105.

For example, when logic of n-th lower bit of the mask data is '1', data of n-th byte from the access address of the frame buffer 105 are replaced with data of n-th byte of the sequence of drawing data, while the data there are left as they are when the logic of the lower n-th bit of the mask data is '0'.

Therefore, it is important for the graphics LSI to generate the mask data with a sufficient speed.

There is a method for generating the mask data disclosed in a Japanese patent application laid open as a Provisional Publication No. 225453/'92, wherein the mask data generator 104 is provided with two registers for storing mask data to be used for masking a start data sequence and an end data sequence respectively.

Here, the start data sequence means a sequence of drawing data to be written with one access including data of a beginning part of each line data of a graphic image to be drawn, and the end data sequence means that including an ending part of the line data. When a rectangular fill is drawn, for example, every line data should be written at the same horizontal addresses. So, by preparing mask data for the start sequence and the end sequence separately, the mask data generation can be performed at a high speed making rise of the prepared mask data.

FIG. 6 is a block diagram illustrating configuration of the mask data generator according to the prior art for generating mask data of 128 bits, that is, mask data for masking a sequence of drawing data of 128 bytes to be written in the frame buffer 105 with one access.

Referring to FIG. 6, mask data of 128 bits for masking a start data sequence are supplied from a CPU 100 through bus lines 110 to be registered in a start mask register 202. In the same way, mask data of 128 bits for masking an end data sequence are registered in an end mask register 203.

Watching the access addresses generated by the address generator 102 of FIG. 1, a start mask control section 204 sends a signal to a start multiplexer 206 when access address of the start data sequence is found. The start multiplexer 206 selects and outputs the mask data stored in the start mask register 202 when it receives the signal from the start mask control section 204, while otherwise it outputs data of 128 bits, every logic thereof being '1'. In the same way an end multiplexer 207 selects and outputs the mask data stored in the end mask register 203 when an end mask control section 205 detects access address of the end data sequence generated by the address generator 102, and otherwise outputs mask data of 128 bits all having logic '1'.

An AND gate array 208 calculates logical products of the output of the start multiplexer 206 and that of the end multiplexer 207 to be output as the mask data of 128 bits for each sequence of drawing data.

However, according to the mask data generator of the prior art of FIG. 6, it takes four clock cycles for supplying data of 128 bits to be registered in the start mask register 202 as well as in the end mask register 203 through the bus lines 110 when width of the bus lines 110 is 32 bits parallel. This is a problem.

FIG. 7 is a block diagram illustrating another conventional example of the mask data generator 104 for generating mask data of 8 bits for masking a sequence of drawing data of 8 bytes, 64 bits, wherein mask data are generated from address data of a beginning pixel and address data of an ending pixel of line data.

In the example of FIG. 7, a first multiplexer 700 and a second multiplexer 701 are provided in place of the start mask register 202 and the end mask register 203 of FIG. 6, respectively.

The first multiplexer 700 selects and outputs one of eight bytes, 'FF', 'FE', 'FC', 'F8', 'F0', 'E0', 'C0' and '80' in hexadecimal, according to logic of lower three bits [2:0] of address data of a beginning pixel to be drawn in a line memory of the frame buffer 105.

For example, when the lower three bits of the beginning pixel address indicate '001' in binary code, that is, when effective drawing data begins from second byte of the start data sequence of eight bytes, the first multiplexer 700 selects a byte of 'FE', in hexadecimal (hereafter expressed as 'FEh'), that is, '1111 1110' in binary code (hereafter binary codes are expressed such as '1111 1110'), indicating that the first byte of the sequence of drawing data corresponding to the lowest bit '0' should be masked.

In the same way, the second multiplexer 701 selects and outputs one of eight bytes, '01h', '03h', '07h', '0Fh', '1Fh', '3Fh', '7Fh' and 'FFh', according to logic of lower three bits [2:0] of the ending pixel address.

Table 1 represents outputs of the first multiplexer 700 and the second multiplexer 701 relative to their control logic, that is, logic of lower three bits of the beginning pixel address or the ending pixel address.

Similarly with the mask data generator of FIG. 6, the start multiplexer 206 selects and output the byte data selected by the first multiplexer 700 when the start mask control section 204 detects an access address of the start data sequence generated by the address generator 102, and otherwise outputs byte data of 'FFh'. The end multiplexer 207 selects and outputs the byte data selected by the second multiplexer 701 when the end mask control section 205 detects access address of the end data sequence, and otherwise outputs byte data of 'FFh'. The mask data of eight bits to be output are obtained from the AND gate array 207 calculating logical products of the output of the start multiplexer 206 and that of the end multiplexer 208.

TABLE 1

| control | output | |
|---|---|---|
| logic | first multiplexer | second multiplexer |
| 000b | FFh = 1111 1111b | 01h = 0000 0001b |
| 001b | FEh = 1111 1110b | 03h = 0000 0011b |
| 010b | FCh = 1111 1100b | 07h = 0000 0111b |
| 011b | F8h = 1111 1000b | 0Fh = 0000 1111b |
| 100b | F0h = 1111 0000b | 1Fh = 0001 1111b |
| 101b | E0h = 1110 0000b | 3Fh = 0011 1111b |
| 110b | C0h = 1100 0000b | 7Fh = 0111 1111b |
| 111b | 80h = 1000 0000b | FFh = 1111 1111b |

According to the method applied in the mask data generator of FIG. 7, there is no need to supply mask data through the bus lines, but a fairly large scale of circuit configuration becomes necessary if mask data of 128 bits, for example, are to be generated in the same way, since the first and the second multiplexers 700 and 701 should select data of 128 bits from 128 patterns of data of 128 bits, that is, 16,400 bits. This is another problem.

SUMMARY OF THE INVENTION

Therefore, a primary object of the present invention is to provide a mask data generator operating at a sufficient speed with a comparatively small scale of circuit configuration.

In order to achieve the object, a mask data generator of the invention for generating mask data to mask a sequence of drawing data composed of a plurality of data blocks to be written with one access in a frame buffer of a graphics LSI comprises;

a first mask data generation circuit for preparing start mask data according to address data indicating a beginning pixel address of the frame buffer wherefrom pixel data of a line are to be written, and a second mask data generation circuit for preparing end mask data according to address data indicating an ending pixel address of the frame buffer whereto pixel data of the line are to be written.

Each of the first and the second mask data generation circuits comprises;

bit pattern extracting means for obtaining a first bit pattern indicating a boundary block among the plurality of data blocks wherein pixel data designated by the address data are included, and a second bit pattern indicating a position of the pixel data in the boundary block, according to the address data, a boundary byte discrimination circuit for discriminating the boundary block making use of the first bit pattern, and an array of multiplexers, each multiplexer of the array of multiplexers corresponding to each of the plurality of data blocks, one multiplexer of the array of multiplexers corresponding to the boundary block selecting the second bit pattern controlled by the boundary byte discrimination circuit, and each of the other multiplexers of the array of multiplexers selecting either a third bit pattern or a fourth bit pattern according to each position of corresponding one of the plurality of data blocks relative to the boundary block controlled by the boundary byte discrimination circuit, logic of every bit of the third bit pattern being '0' and logic of every bit of the fourth bit pattern being '1', and Therefore, the start mask data and the end mask data can be prepared directly from the beginning pixel address and the ending pixel address with a sufficient speed independent of bit width of the bus lines, as well as with a comparatively small circuit configuration.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 2:
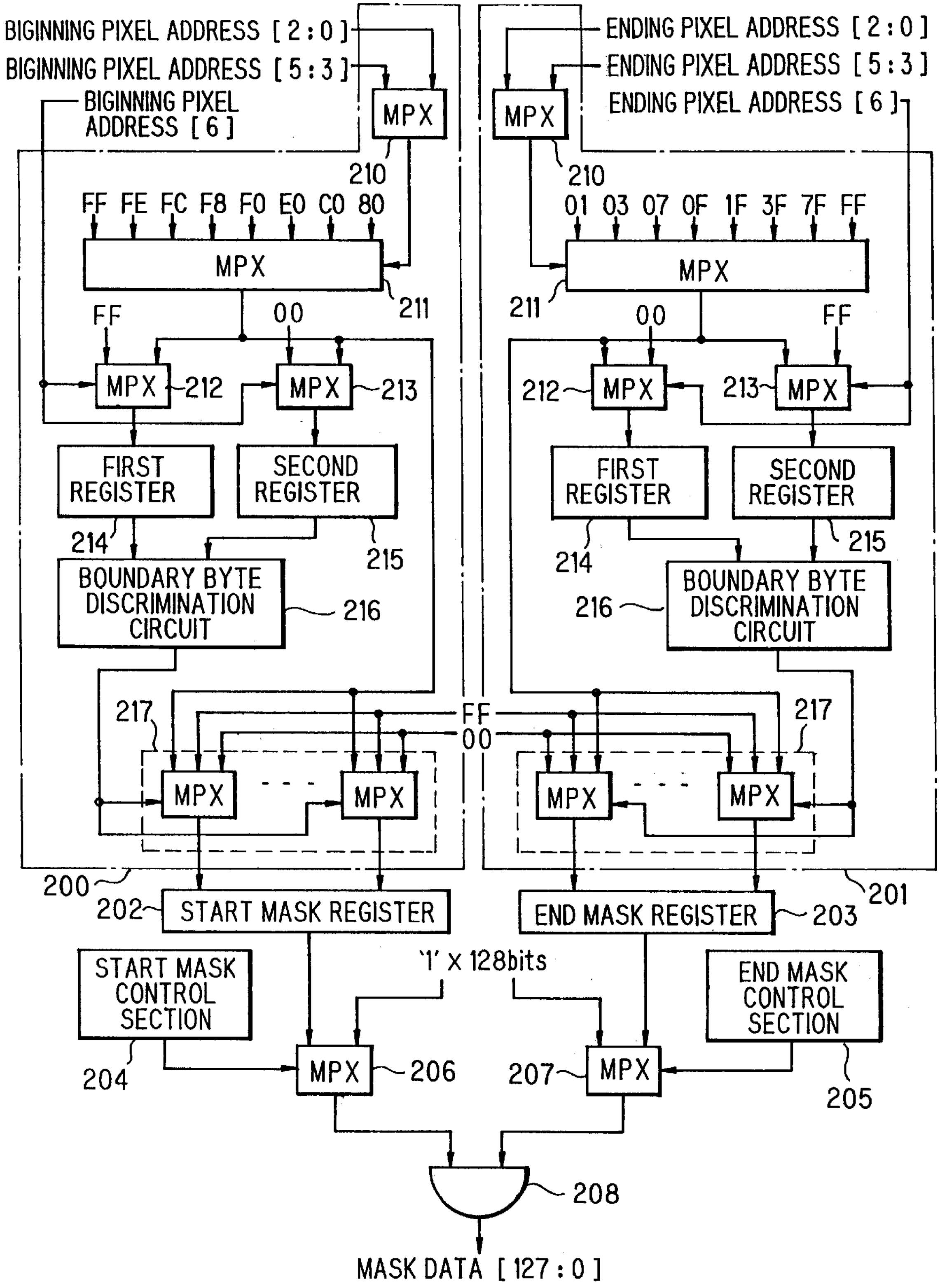
FIG. 2 is a block diagram illustrating a mask data generator according to an embodiment of the invention.

FIG. 2 is a block diagram illustrating a mask data generator for masking a sequence of drawing data of 128 bytes according to an embodiment of the invention, having;

a first mask data generation circuit 200, a start mask register 202 for storing output of the first mask data generation circuit 200, a second mask data generation circuit 201, an end mask register 203 for storing output of the second mask data generation circuit 201, a start mask control section 204, an end mask control section 205, a start mask multiplexer 206 for selecting and outputting data stored in the start mask register 202 when controlled by the start mask control section 204, and otherwise selecting and outputting data of 128 bits all having logic '1', an end mask multiplexer 207 for selecting and outputting data stored in the end mask register 203 when controlled by the end mask control section 205, and otherwise selecting and outputting data of 128 bits all having logic '1', and an AND gate array 208 for calculating logical products of the output of the start mask multiplexer 206 and the output of the end mask multiplexer 207 to be output as the mask data of 128 bits for masking each sequence of drawing data of 128 bytes.

The first mask data generation circuit 200 and the second mask data generation circuit 201 have similar configuration with each other.

Each of the first and the second mask data generation circuits 200 and 201 comprises;

- a first multiplexer 210 for selecting, by time sharing, either of lower three bits [2:0] or following three bits [5:3] of the beginning/ending pixel address, namely, address data of a beginning pixel (in the first mask data generation circuit 200) or an ending pixel (in the second mask data generation circuit 201) to be drawn in a line memory of the frame buffer 105,
- a second multiplexer 211 for selecting one of eight byte patterns, 'FFh', 'FEh', 'FCh', 'F8h', 'F0h', 'E0h', 'C0h'and '80h' in the first mask data generation circuit 200 or '01h', '03h', '07h', '0Fh', '1Fh', '3Fh', '7Fh' and 'FFh' in the second mask data generation circuit 201, according to logic of three bits output from the first multiplexer 210 in the same way represented in Table 1,
- a third multiplexer 212 for selecting a byte pattern 'FFh' (in the first mask data generation circuit 200) or '00h' (in the second mask data generation circuit 201) when logic of the seventh bit [6] of the beginning/ending pixel address is '0', and selecting output of the second multiplexer 211 when the logic of the seventh bit [6] is '1',
- a fourth multiplexer 213 for selecting output of the second multiplexer 211 when logic of the seventh bit [6] of the beginning/ending pixel address is '0', and selecting a byte pattern '00h ' (in the first mask data generation circuit 200) or 'FFh' (in the second mask data generation circuit 201) when the logic of the seventh bit [6] is '1',
- a first register 214 and a second register 215 for storing output of the third and the fourth multiplexer 212 and 213, respectively,
- a boundary byte discrimination circuit 216 for generating 16 pairs of boundary indicating signals from data of 16 bits stored in the first and the second register 214 and 215, each of the 16 pairs of boundary indicating signals representing logic of each of the 16 bits stored in the first and the second register 214 and 215 and its next lower bit (when the pair of boundary indicating signal corresponds to the lowest bit of the data stored in the second register 215, it represents logic of the lowest bit and '0'), in the first mask data generation circuit 200 and representing logic of each of the 16 bits stored in the first and the second register 214 and 215 and its next higher bit (when the pair of boundary indicating signal corresponds to the highest bit of the data stored in the first register 214, it represents logic of '0' and the highest bit), in the second mask data generation circuit 201, and
- a multiplexer array 217 having 16 multiplexers, each of the 16 multiplexers, controlled with each of the 16 pairs of boundary indicating signals, selecting a byte data 'FFh', '00h' or output of the second multiplexer 211 when corresponding pair of the boundary indicating signals indicate '11b', '00b' or '10b'/'01b', respectively.

Now, operation of the embodiment of FIG. 2 will be described when a beginning pixel address '34h', indicating that effective drawing data begin from 52-th (in decimal) byte of a start sequence, is delivered to the first mask data generation circuit 200, by way of example.

Figure 4:
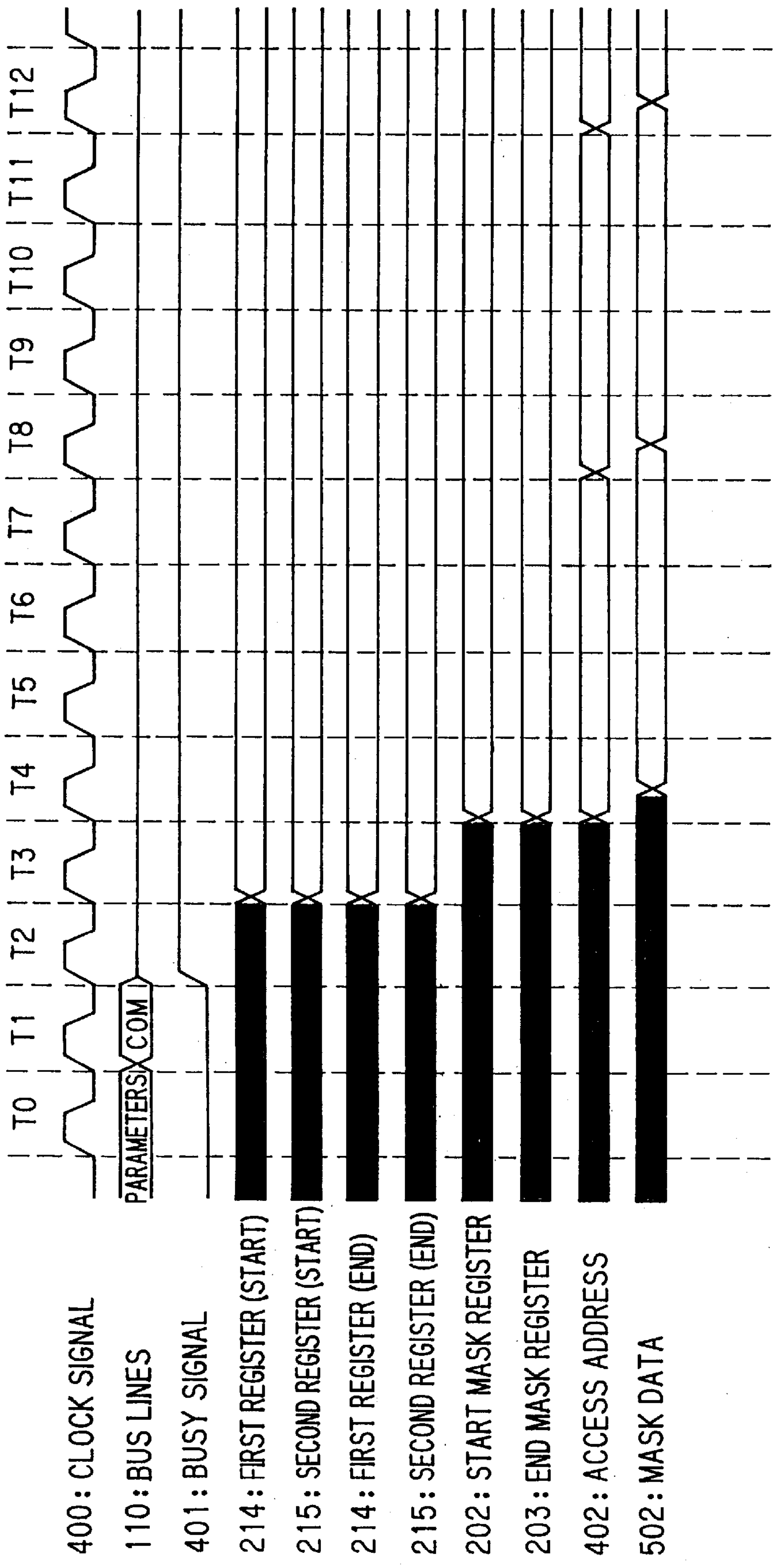
FIG. 4 is a timing chart illustrating operation of the embodiment of FIG. 2.
Figure 5:
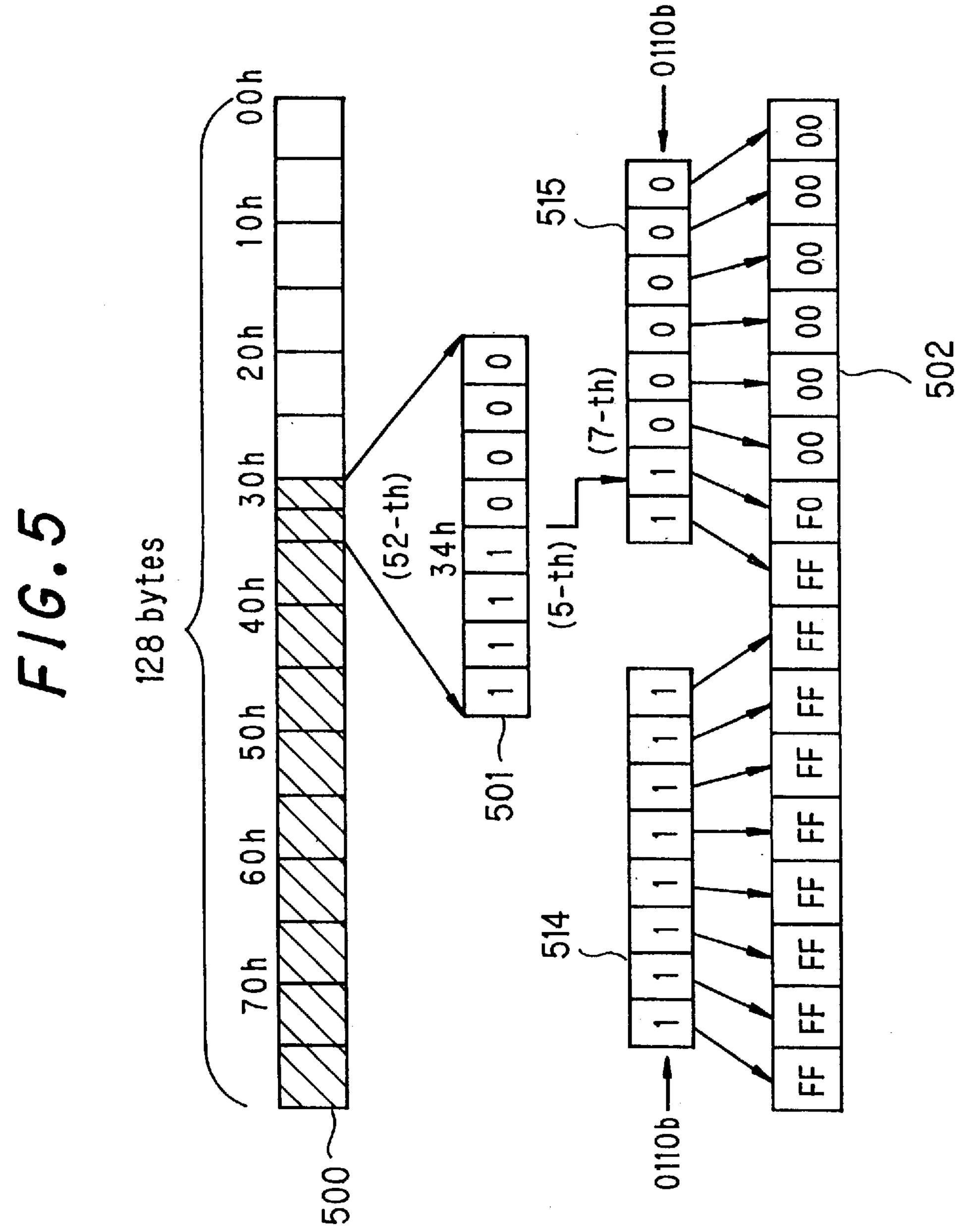
FIG. 5 is a graphic chart illustrating data flow in the embodiment of FIG. 2.

FIG. 4 is a timing chart illustrating operation of the embodiment of FIG. 2, and FIG. 5 is a graphic chart illustrating data flow there in the case.

Figure 1:
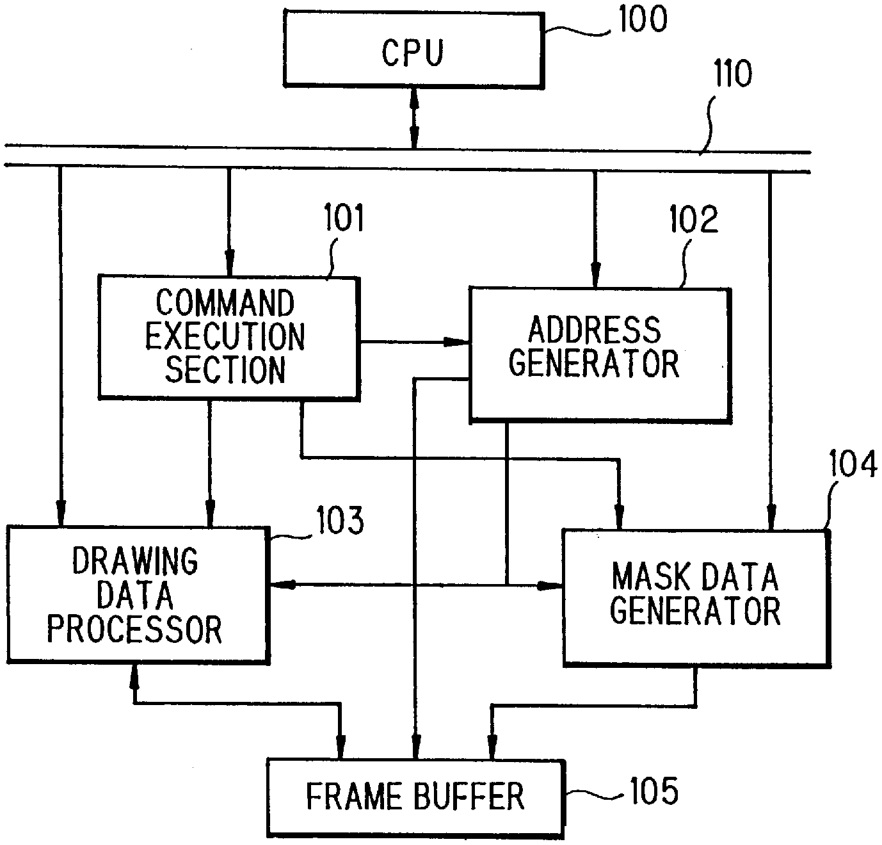
FIG. 1 is a schematic diagram illustrating an example of the graphics LSI for drawing graphic images.

Referring to FIG. 4, parameters necessary for generating drawing data being delivered to the drawing data processor 103 of FIG. 1 until a clock cycle T0 of a clock signal 400, a start command COM is supplied at clock cycle T1 through the bus lines 110 and drawing process is started, a busy signal 401 becoming ON.

At clock cycle T2, according to logic '110b' of second lower three bits [5:3] of the beginning pixel address '34h' selected by the first multiplexer 210, a byte pattern 'C0h'= '1100 0000b' is selected by the second multiplexer 211 as illustrated in Table 1. As the seventh lower bit [6] of '34h' being '0', namely, as the beginning pixel stands in former half of the start sequence of 128 bytes, the third multiplexer 212 selects a byte pattern 'FFh', and the fourth multiplexer 213 selects the byte pattern 'C0h'='1100 0000b' output from the second multiplexer 211.

At clock cycle T3, outputs of the third and the fourth multiplexers 212 and 213 are stored in the first and the second registers 214 and 215, respectively, as shown in data 514 and 515 of FIG. 5.

Data 514 and 515 of 16 bits, namely data '1111 1111 1100 0000b', indicate that the data of the beginning pixel exists in seventh block of eight bytes of the start sequence 500 of 128 bytes, when the start sequence 500 is divided into 16 blocks of eight bytes.

On the other hand, the first multiplexer 210 outputs logic '100b' of lower three bits [2:0] of the beginning pixel address also at clock cycle T3, and the second multiplexer 211 selects a corresponding byte pattern 'F0h'='1111 0000b' as shown data 501 of FIG. 5, indicating that the effective drawing data begin from fifth byte of the block of eight bytes.

The boundary byte discrimination circuit 216 generates the 16 pairs of the boundary indicating signals according to the data 514 and 515.

Therefore, former six pairs of the boundary indicating signals indicate logic '00b', the seventh pair indicates logic '10' and the latter nine pairs indicate logic '11b', controlling former six multiplexers of the multiplexer array 217 to select byte patterns '00h', the seventh multiplexer to select the byte pattern 'F0h'='1111 0000b' output of the second multiplexer 211 and the latter nine multiplexers to select byte patterns 'FFh'.

At clock cycle T4, the outputs of the multiplexer array 217 are registered in the start mask register 202.

Thus, start mask data 502 of 128 bits as shown in FIG. 5 are prepared in the start mask register 202 within four clock cycles after delivering necessary parameters for preparing drawing data, in the embodiment.

In the same way, end mask data are prepared also at clock cycle T4 in the end mask register 203 in parallel by the second mask data generation circuit 201, and duplicated description is omitted.

Figure 3:
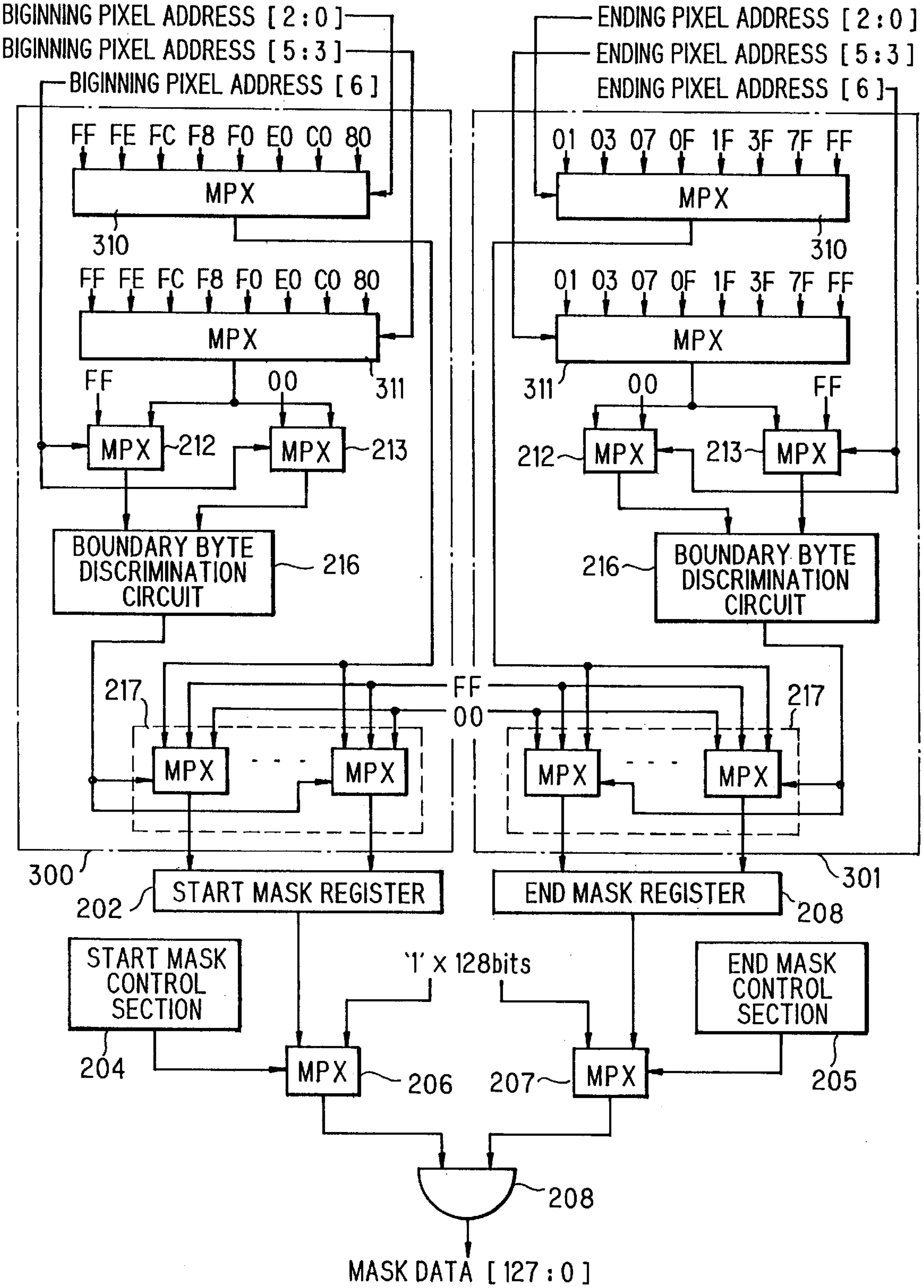
FIG. 3 is a block diagram illustrating a mask data generator according to another embodiment of the invention.

Now, another embodiment of the invention is described referring to a block diagram of FIG. 3, wherein a first and a second mask data generation circuits 300 and 301 are provided in place of the first and the second mask data generation circuit 200 and 201 of the embodiment of FIG. 2.

In each of the first and the second mask data generation circuit 300 and 301, a first multiplexer 310 selects one of the eight byte patterns 'FFh' to '80h' (in the first mask data generation circuit 300) or '01h' to 'FFh' (in the second mask data generation circuit 301) according to logic of lower three bits [2:0] of the beginning/ending pixel address, while a second multiplexer 311 selecting one of the eight byte patterns 'FFh' to '80h'/'01h' to 'FFh' according to logic of following lower three bits [5:3] of the beginning/ending pixel address, in parallel.

The output of the of the second multiplexer 311 is selected by the third multiplexer 212 or the fourth multiplexer 213, according to logic of the seventh bit [6] of the beginning/ending pixel address, to be used by the boundary byte discrimination circuit 216 for generating 16 pairs of boundary indicating signals in the same way with the embodiment of FIG. 2.

The output of the first multiplexer 310 is selected by one of the 16 multiplexers of the multiplexer array 217 controlled by a pair of the 16 pairs of the boundary indicating signals having logic '10b'/'01b' in the same way with the embodiment of FIG. 2.

Thus, start mask data and end mask data of 128 bits are prepared in the start mask register 202 and the end mask register 203 within three clock cycles after delivering necessary parameters for preparing drawing data, in the embodiment of FIG. 3.

In the following paragraphs, merits of the mask data generator according to the invention is described compared to the prior art of FIG. 6 and FIG. 7.

Figure 6:
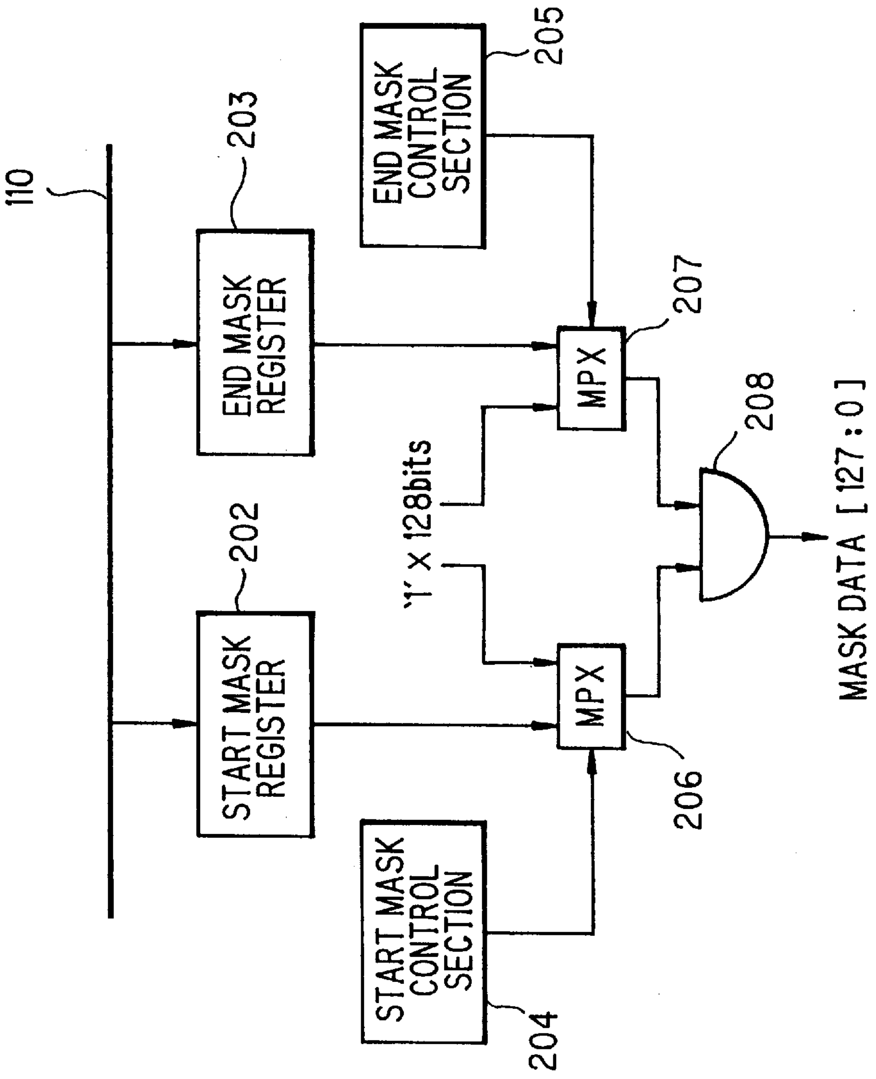
FIG.6 PRIOR ART
FIG. 6 is a block diagram illustrating configuration of a mask data generator according to a prior art.
Figure 8:
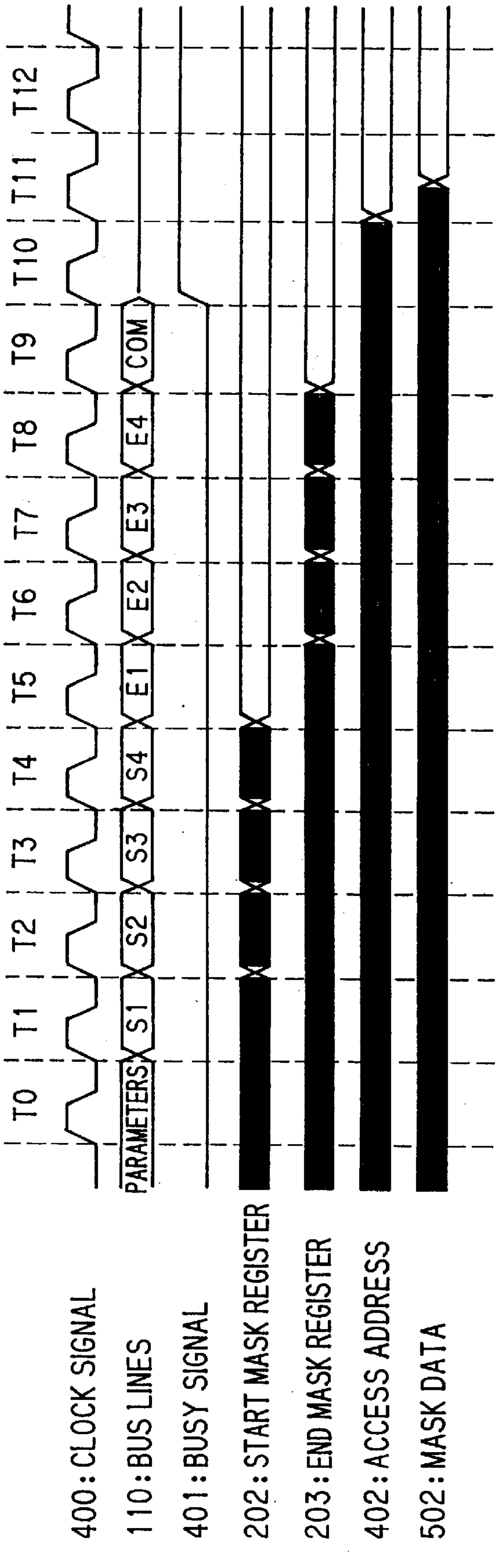
FIG.8 PRIOR ART
FIG. 8 is a timing chart illustrating operation of the prior art of FIG. 6.

FIG. 8 is a timing chart illustrating operation of the mask data generator of the prior art of FIG. 6, wherein it takes eight clock cycles T1 to T8 for delivering start mask data and end mask data of 128 bits through the bus lines 110 of 32 bits parallel, more than embodiments of FIG. 2 illustrated in FIG. 4.

Figure 7:
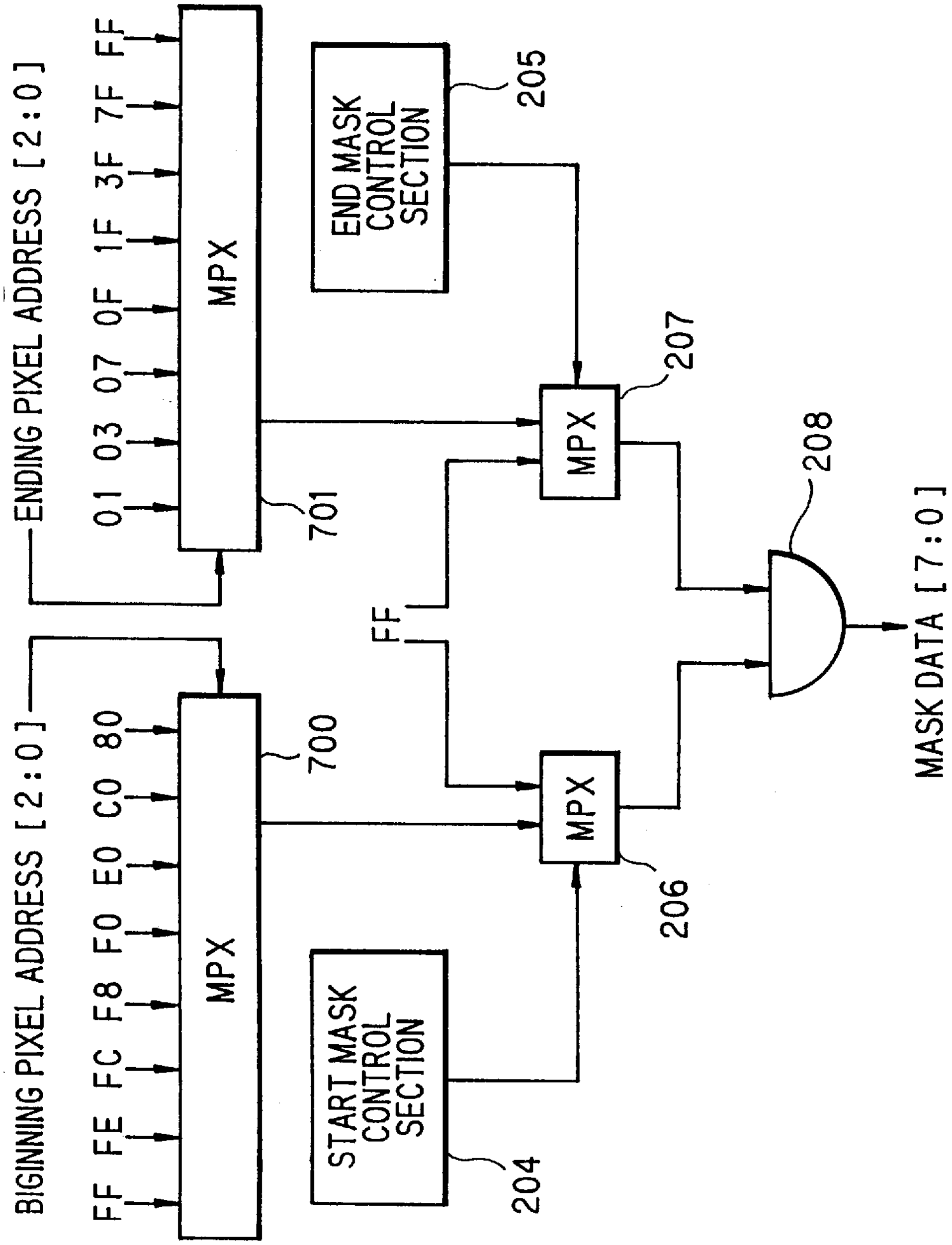
FIG. 7 PRIOR ART
FIG. 7 is a block diagram illustrating configuration of a mask data generator according to another prior art.

As for circuit scale compared to the prior art of FIG. 7, when a mask data generator of 128 bits is configured according to the prior art of FIG. 7, one mask pattern of 128 bits should be selected among 128 patterns of 128 bits, for generating each of the start mask data and the end mask data.

When circuit scale of a 2 to 1 multiplexer of 1 bit is defined to 1, that of a 3 to 1 multiplexer is about 1.4, that of 8 to 1 is about 3.0 and circuit scale of a register of 1 bit is about 1.2.

For selecting one of 128, sixteen of 8 to 1 multiplexers for selecting 16 of 128, two of 8 to 1 multiplexers for selecting 2 of 16 and one of 2 to 1 multiplexer for selecting 1 of 2 are needed for each bit. Therefore, circuit scale of the first or the second multiplexer 700 or 701 of the prior art of FIG. 7 for selecting one mask pattern of 128 bits from 128 patterns costs about;

$$((3.0\times(16+2)+1.0\times1)\times128\text{bit}=7040.$$

On the other hand, circuit scale of the first or the second mask data generation circuits 200 or 201 is the sum of circuit scales of:

- the first multiplexer 210 (2 to 1 of 3 bits): 1.0×3bits=3;
- the second multiplexer 211 (8 to 1 of 8 bits): 3.0×8bits=24
- the third and the fourth multiplexer 212 and 213 (2 of 2 to 1 of 8 bits): 1.0×8bits×2=16;
- the first and the second register 214 and 215 (2 of 8bits): 1.2×8bits×2=19.2;
- the boundary byte discrimination circuit 216 (about 0.6 of 16bits): 0.6×16bit=9.6;
- the multiplexer array (16 of 3 to 1 of 8bits): 1.4×8bits×16=179.2; and
- the start/end mask register 202/203 (128bits): 1.2×128bits=153.6.

Therefore, the embodiment of FIG. 2 can be configured with circuit scale of about 404.6, namely, only 5.75% of the prior art of FIG. 7.

What is claimed is:

1. A mask data generator of a graphics LSI for generating mask data to mask a sequence of drawing data composed of a plurality of data blocks to be written with one access in a frame buffer, said mask data generator having at least one mask data generation circuit, each of said at least one mask data generation circuit comprising:

bit pattern extracting means for extracting a first bit pattern and a second bit pattern from address data, said first bit pattern indicating a boundary block among the plurality of data blocks wherein pixel data designated by said address data are included, and said second bit pattern indicating a position of said pixel data in said boundary block, according to said address data;

a boundary byte discrimination circuit for discriminating said boundary block making use of said first bit pattern; and an array of multiplexers, each multiplexer of said array of multiplexers corresponding to each of said plurality of data blocks, one multiplexer of said array of multiplexers, which corresponds to said boundary block, selecting said second bit pattern controlled by said boundary byte discrimination circuit, and each of the other multiplexers of said array of multiplexers selecting either a third bit pattern or a fourth bit pattern according to each position of corresponding one of said plurality of data blocks relative to said boundary block controlled by said boundary byte discrimination circuit, logic of every bit of said third bit pattern being '0' and logic of every bit of said fourth bit pattern being '1'.

2. A mask data generator recited in claim 1, said bit pattern extracting means comprising:

a first multiplexer for selecting one of a higher bit sequence and a lower bit sequence of said address data by time sharing, said higher bit sequence adjoining to said lower bit sequence;

a second multiplexer for selecting said first bit pattern among a plurality of bit patterns according to logic of said higher bit sequence and said second bit pattern among said plurality of bit patterns according to logic of said lower bit sequence, each of said plurality of bit patterns corresponding to each logic of said higher bit sequence or said lower bit sequence; and a first register for storing said first bit pattern.

3. A mask data generator recited in claim 1, said bit pattern extracting means comprising:

a first multiplexer for selecting said first bit pattern among a plurality of bit patterns according to logic of a higher bit sequence of said address data; and a second multiplexer for selecting said second bit pattern among said plurality of bit patterns according to logic of a lower bit sequence of said address data.

4. A mask data generator recited in claim 1, said at least one mask data generation circuit being a first mask data generation circuit for preparing start mask data according to address data indicating a beginning pixel address of the frame buffer wherefrom pixel data of a line are to be written, and a second mask data generation circuit for preparing end mask data according to address data indicating an ending pixel address of the frame buffer whereto pixel data of said line are to be written; and said mask data generation circuit further comprising:

a start mask register for storing output of said array of multiplexers of said first mask data generation circuit;

an end mask register for storing output of said array of multiplexers of said second mask data generation circuit;

a start mask control section for detecting a start access address of the frame buffer generated for the sequence of drawing data including pixel data to be written at said beginning pixel address;

a start mask multiplexer for selecting a bit pattern stored in said start mask register when said start access address is detected by said start mask control section, and otherwise selecting a fifth bit pattern, logic of every bit of said fifth bit pattern being '1';

an end mask control section for detecting an end access address of the frame buffer generated for the sequence of drawing data including pixel data to be written at said ending pixel address;

an end mask multiplexer for selecting a bit pattern stored in said end mask register when said end access address is detected by said end mask control section, and otherwise selecting said fifth bit pattern; and an AND gate array for outputting logical products of a bit pattern selected by said start mask multiplexer and a bit pattern selected by said end mask multiplexer.

* * * * *